(12) United States Patent
Jinushi

(10) Patent No.: US 6,999,793 B2
(45) Date of Patent: Feb. 14, 2006

(54) INFORMATION TERMINAL HAVING CARD AND MAIN BODY PROVIDED WITH ANTENNA

(75) Inventor: Satoru Jinushi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 592 days.

(21) Appl. No.: 10/141,162

(22) Filed: May 8, 2002

(65) Prior Publication Data

US 2002/0169003 A1 Nov. 14, 2002

(30) Foreign Application Priority Data

May 14, 2001 (JP) .............................. 2001-143262

(51) Int. Cl.
*H04B 1/38* (2006.01)
(52) U.S. Cl. ................ 455/558; 455/562.1; 455/575.7; 455/90.3; 455/557; 343/702
(58) Field of Classification Search ............. 455/550.1, 455/556.1–558, 562.1, 575.1, 575.5, 575.7, 455/121, 274; 343/702, 721, 841, 895
See application file for complete search history.

(56) References Cited

U.S. PATENT DOCUMENTS

| | | | |
|---|---|---|---|
| 5,469,178 A * | 11/1995 | Nguyen et al. ............. | 343/702 |
| 5,541,610 A * | 7/1996 | Imanishi et al. ............ | 343/702 |
| 5,809,115 A * | 9/1998 | Inkinen ...................... | 455/557 |
| 5,867,131 A * | 2/1999 | Camp et al. ................. | 343/797 |
| 5,870,065 A * | 2/1999 | Kanba et al. ............... | 343/895 |
| 5,918,163 A * | 6/1999 | Rossi ......................... | 455/558 |
| 5,936,584 A * | 8/1999 | Lawrence et al. .......... | 343/702 |
| 6,295,031 B1 * | 9/2001 | Wallace et al. ............. | 343/702 |
| 6,412,702 B1 * | 7/2002 | Ishikawa et al. ........... | 235/492 |
| 6,456,245 B1 * | 9/2002 | Crawford ................. | 455/277.1 |
| 6,568,600 B1 * | 5/2003 | Carpier et al. .............. | 235/492 |
| 6,570,537 B1 * | 5/2003 | Frey, Jr. ...................... | 342/373 |
| 6,570,538 B1 * | 5/2003 | Vaisanen et al. ............ | 343/702 |
| 6,594,506 B1 * | 7/2003 | Vapaakoski et al. ........ | 455/557 |
| 6,768,460 B1 * | 7/2004 | Hoashi et al. ....... | 343/700 MS |
| 2002/0080565 A1 * | 6/2002 | Teshima ...................... | 343/702 |

FOREIGN PATENT DOCUMENTS

| JP | 2001-312339 | 11/2001 |
|---|---|---|
| JP | 2001-344043 | 12/2001 |

* cited by examiner

*Primary Examiner*—Joseph Feild
*Assistant Examiner*—Kamran Afshar
(74) *Attorney, Agent, or Firm*—Brinks Hofer Gilson & Lione

(57) ABSTRACT

An information terminal of the present invention is provided with a card. The information terminal includes a main body provided with an antenna. When the card is inserted into a recessed portion formed in the main body, a first electrical circuit of the card is electrically connected to the information terminal and a conductor in the card is electrically coupled to the antenna. Accordingly, the card can be miniaturized.

9 Claims, 4 Drawing Sheets

INFORMATION TERMINAL HAVING CARD AND MAIN BODY PROVIDED WITH ANTENNA

This application claims the benefit of priority to Japanese Patent Application 2001-143262, filed on May 14, 2001.

BACKGROUND OF THE INVENTION

1. Field of the Invention

The present invention relates to an information terminal having a card such as a wireless card (memory card).

2. Description of the Related Art

FIG. 6 illustrates an information terminal having a known card. The information terminal 51, which is a personal computer for example, includes a main body 52 having a wiring board (not shown) in which a desired electrical circuit (not shown) is formed. The main body 52 comprises an insulating box-shaped case 53 having an upper part and a lower part and a recessed portion 53a provided in the front surface of the case 53.

The card 54 is a wireless card used for short-range wireless data communication (Bluetooth). The card 54 includes an insulating box-shaped cover 55 having an upper part and a lower part, a circuit board 56 which is accommodated in the cover 55 and which has a desired electrical circuit, a conductive pattern 57 provided in the circuit board 56, and an antenna 58 formed by the conductive pattern 57.

The card 54 can be inserted into and ejected from the recessed portion 53a of the main body 52.

Subsequently, the operation of the information terminal having the card configured in the above-described manner will be described. First, when the card 54 is inserted into the recessed portion 53a, the electrical circuit formed in the card 54 is connected to the electrical circuit of the information terminal 51.

Then, the data from the information terminal 51 is transmitted to an external terminal (not shown) via the antenna 58 of the card 54 so that exchange of data between the information terminal 51 and the external terminal is performed.

Also, apart from the wireless card, the card 54 may be a television card or a radio card. The card 54 for television or radio includes an antenna 58 provided in the circuit board 56. When the card 54 is inserted into the recessed portion 53a, the electrical circuit formed in the card 54 is connected to the electrical circuit in the information terminal and a television signal or a radio signal can be received through the antenna 58.

In the information terminal provided with the known card, the antenna 58 is formed in the card 54 and thus the size of the card 54 increases. In addition, each card 54 which has a different application must be provided with the antenna 58, which results in decrease in productivity and high cost.

SUMMARY OF THE INVENTION

Accordingly, it is an object of the present invention to provide an information terminal having a compact and inexpensive card.

In order to overcome the above-described problems, an information terminal according to the present invention comprises a card having a circuit board including a first electrical circuit and a main body having a recessed portion for inserting therein and ejecting the card therefrom. The main body comprises an antenna and the circuit board of the card comprises a conductor which is electrically coupled to the antenna and which is connected to the first electrical circuit. The first electrical circuit is electrically connected to the main body and the conductor is electrically coupled to the antenna when the card is inserted in the recessed portion.

With this arrangement, the card can be miniaturized. Also, each card having a different application does not have the antenna. Thus, productivity of the card is improved and an inexpensive card can be provided.

The main body may further comprise a wiring board having a second electrical circuit, and the antenna may be formed by a wiring pattern provided in the wiring board. Accordingly, the information terminal having a simple configuration and good productivity can be achieved.

Also, the main body may further comprise one of an insulating case and an insulating mounting member, and the antenna may comprise a metallic material and may be embedded in one of the case and the mounting member. With this configuration, the antenna can be easily and securely mounted.

Preferably, a first electrode portion is provided for the antenna, a second electrode portion facing the first electrode portion is provided for the conductor so that the first and second electrode portions face each other and are coupled by capacitive coupling when the card is inserted into the recessed portion. With this arrangement, the antenna and the conductor can be electrically coupled easily.

Also, a dielectric comprising an insulating material may be placed between the first and second electrode portions. Accordingly, a reliable capacitive coupling can be realized.

The card may comprise an insulating cover for accommodating the circuit board and the cover may be the dielectric placed between the first and second electrode portions. With this arrangement, the card also functions as a dielectric, thereby simplifying the configuration.

Preferably, a first electrode portion is provided for the antenna, a second electrode portion facing the first electrode portion is provided for the conductor, a contact segment is connected to one of the first and second electrode portions, the contact segment contacts the other of the first and second electrode portions when the card is inserted into the recessed portion, thereby electrically coupling the antenna and the conductor. With this arrangement, the antenna and the conductor can be electrically coupled reliably.

The main body may comprise a first ground conductor portion that surrounds the first electrode portion and the circuit board may comprise a second ground conductor portion that surrounds the second electrode portion so that the first and second conductor portions face each other when the card is inserted into the recessed portion. Accordingly, the first and second ground conductor portions surround the first and second electrode portions. Thus, preferable HF matching can be realized and transmission loss can be reduced.

Also, the main body may further comprise a wiring board having a second electrical circuit and the first ground conductor portion may be formed by a wiring pattern provided in the wiring board. Accordingly, the information terminal having a simple configuration and good productivity can be achieved.

The main body may further comprise one of an insulating case and an insulating mounting member, and the first conductor portion may comprise a metallic material and may be embedded in one of the case and the mounting member. Accordingly, the first conductor portion can be easily and securely mounted.

Preferably, a dielectric comprising an insulating material is placed between the first and second conductor portions so that the first and second conductor portions face each other and are coupled by capacitive coupling when the card is inserted into the recessed portion. Accordingly, the main body and the card can be electrically coupled easily and the first and second ground conductor portions surround the first and second electrode portions. Thus, preferable HF matching can be realized and transmission loss can be reduced.

Further, the card may comprise an insulating cover for accommodating the circuit board and the cover may be the dielectric placed between the first and second conductor portions. With this arrangement, the card also functions as a dielectric, thereby simplifying the configuration.

DESCRIPTION OF THE PREFERRED EMBODIMENTS

Figure 1:
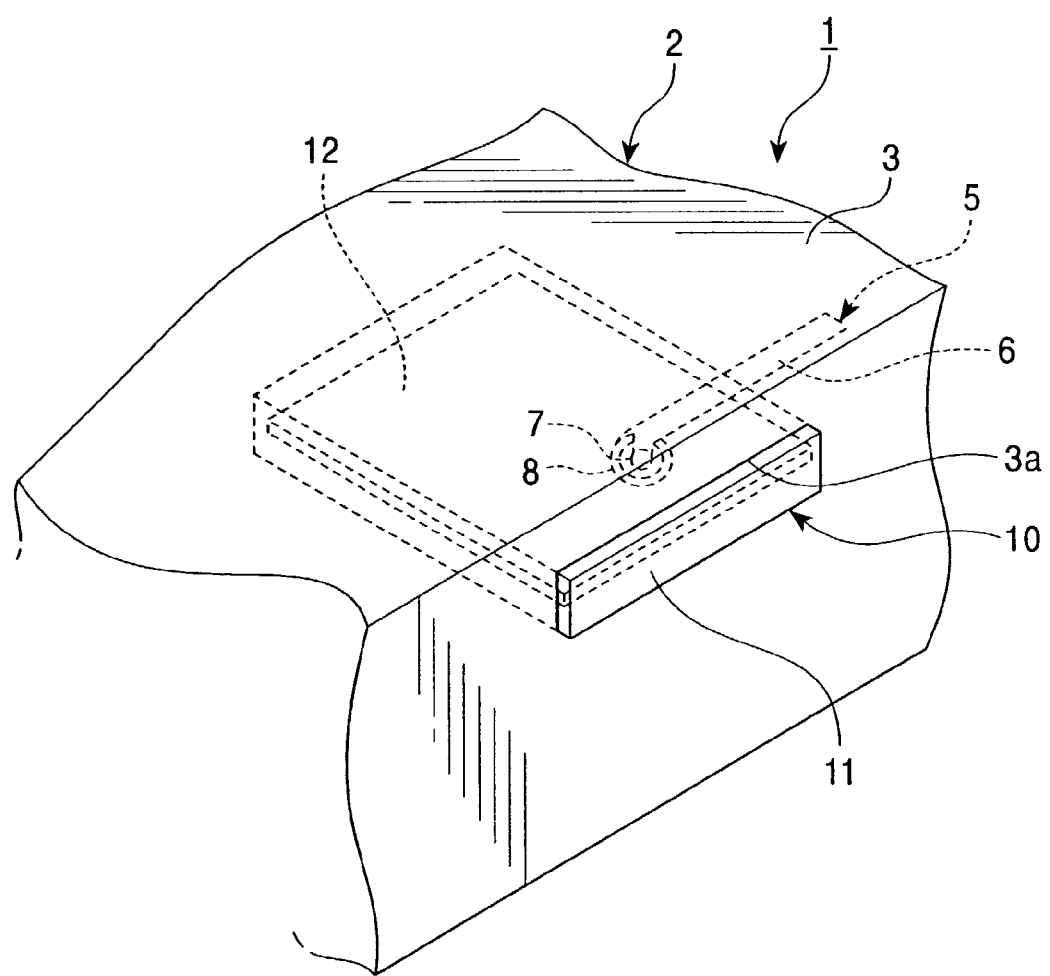
FIG. 1 is a perspective view showing a critical portion of an information terminal provided with the card of the present invention.
Figure 2:
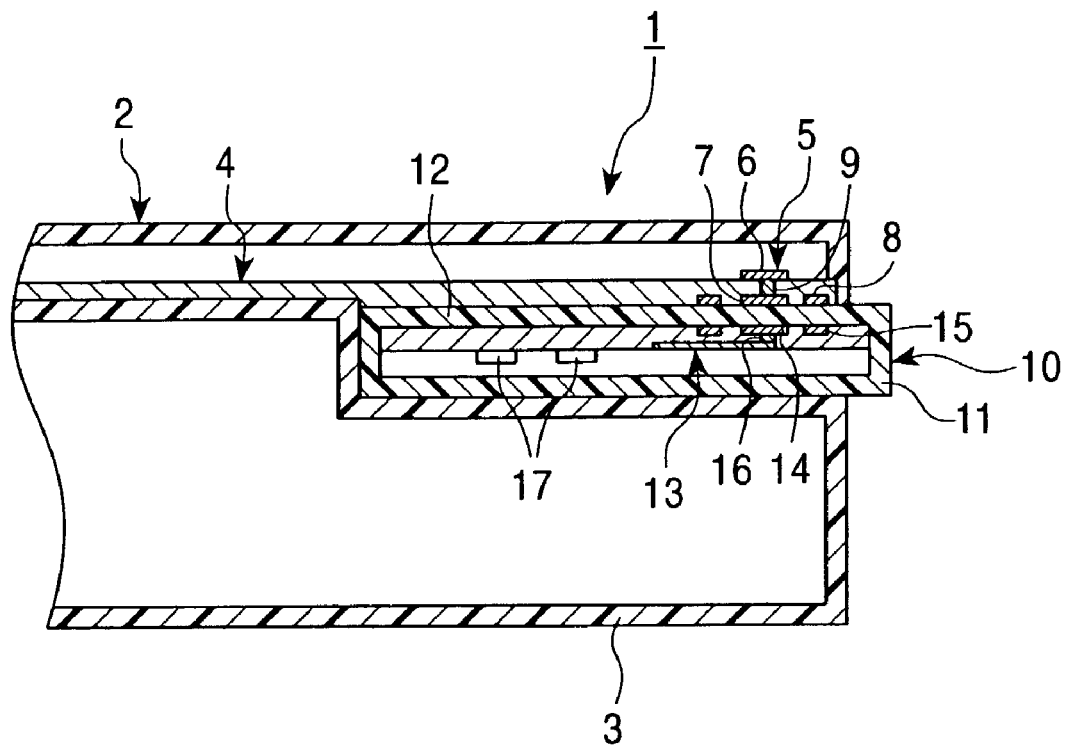
FIG. 2 is a sectional view showing a critical portion of the information terminal provided with the card.
Figure 3:
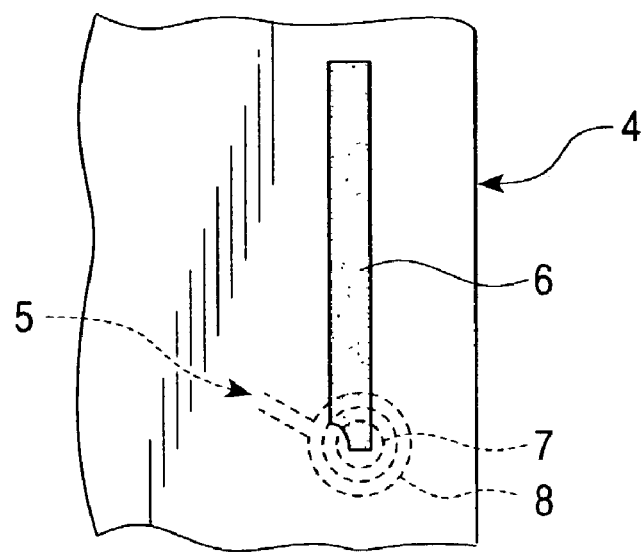
FIG. 3 is a plan view showing a critical portion of a wiring board accommodated in the information terminal.
Figure 4:
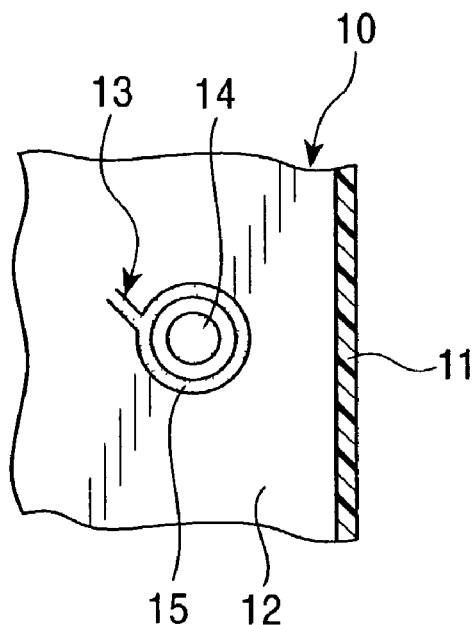
FIG. 4 is a sectional view showing a critical portion taken along a line of a part of the card.
Figure 5:
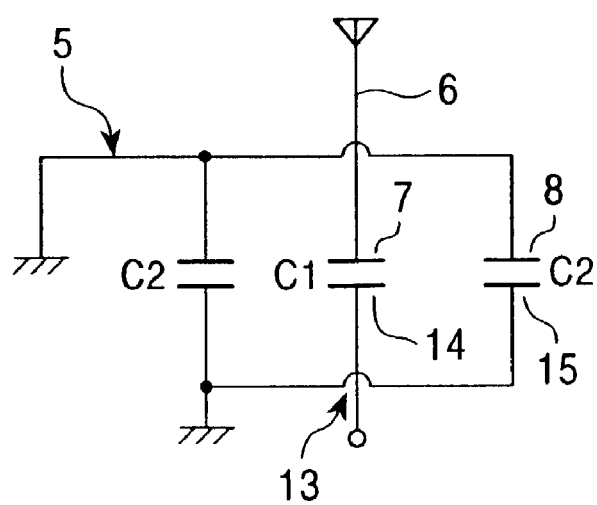
FIG. 5 is a circuit diagram showing the electrical connection between an antenna and the card.
Figure 6:
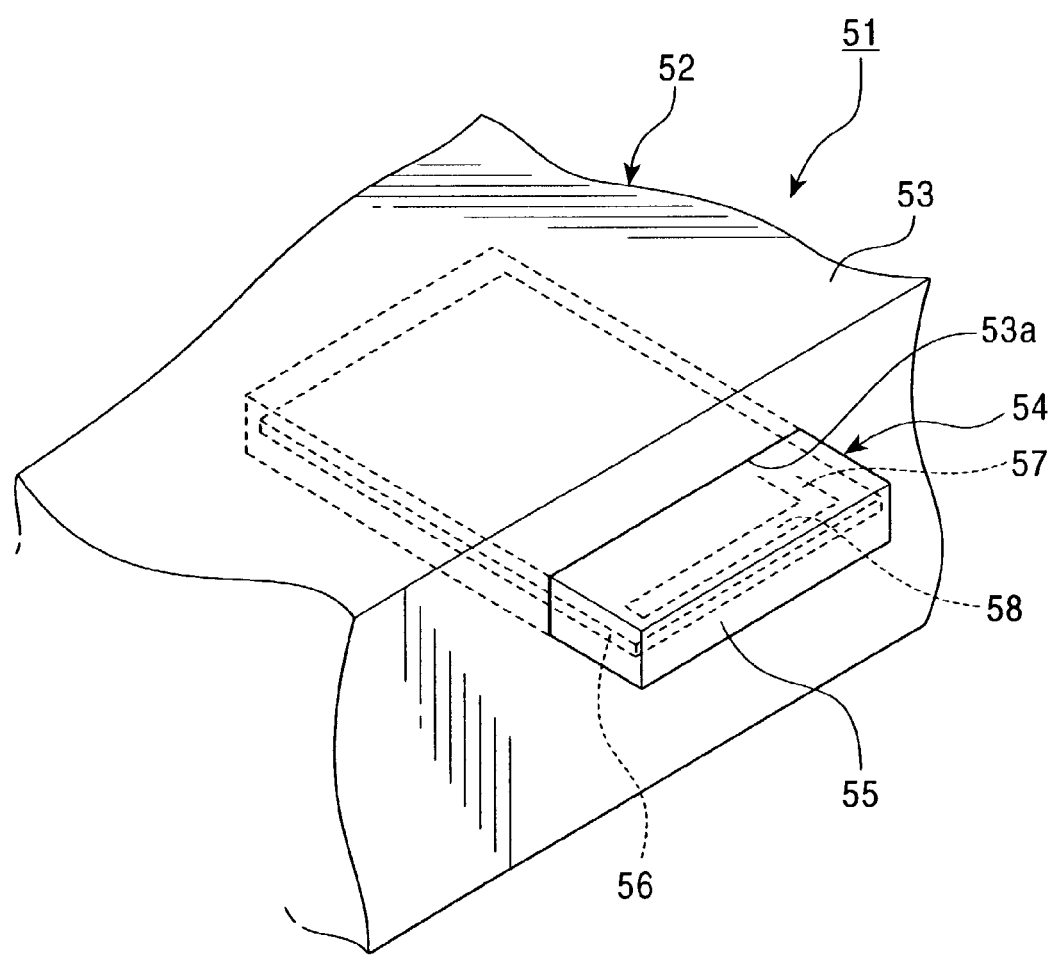
FIG. 6 is a perspective view showing a critical portion of an information terminal provided with a known card.

Hereinafter, an information terminal provided with a card according to the present invention will be described with reference to the accompanying drawings. FIG. 1 is a perspective view showing a critical portion of the information terminal provided with the card of the present invention; FIG. 2 is a sectional view showing a critical portion of the information terminal provided with the card; FIG. 3 is a plan view showing a critical portion of a wiring board accommodated in the information terminal; FIG. 4 is a sectional view showing a critical portion taken along a line of a part of the card; and FIG. 5 is a circuit diagram showing the electrical connection between an antenna and the card.

Subsequently, the configuration of the information terminal provided with the card of the present invention will be described with reference to FIGS. 1 to 5. The information terminal 1, such as a personal computer, has a main body 2. The main body 2 has a box-shaped case 3 having an upper part and a lower part, the case being formed by a molding of synthetic resin, which is an insulating material, a recessed portion 3a provided in the front surface of the case 3, a wiring board 4 which is accommodated in the case 3 and which forms a desired electrical circuit (not shown), and a wiring pattern 5 comprising a conductive material formed in the wiring board 4.

Also, the main body 2 has an antenna 6 formed by the wiring pattern 5, a first electrode portion 7 provided at one end of the antenna 6, and a first ground conductor 8 formed by the wiring pattern 5 and provided so as to surround the first electrode portion 7.

The antenna 6 is provided on one surface (upper surface) of the wiring board 4 and the first electrode portion 7 and the first conductor portion 8 are provided in the surface at the other side (lower side) of the wiring board 4. Accordingly, the antenna 6 is connected to the first electrode portion 7 via a connecting conductor 9.

Further, in the wiring board 4 having the above-described configuration, the first electrode portion 7 and the first conductor portion 8 are exposed at the upper part of the recessed portion 3a and the antenna 6 is positioned above the first electrode portion 7 and the first conductor portion 8.

The first conductor portion 8 is grounded to a ground pattern of the wiring pattern 5.

The card 10 includes a wireless card used for short-range wireless data communication (Bluetooth). The card 10 has a box-shaped cover 11 having an upper part and a lower part, the cover being formed by a molding of synthetic resin, which is an insulating material, a circuit board 12 which is accommodated in the cover 11 and which has a desired electrical circuit, and a conductive pattern 13 which comprises a conductive material and which is provided in the circuit board 12.

The conductive pattern 13 includes a second electrode portion 14 connected to the electrical circuit and formed by a conductor which is a part of the conductive pattern 13; and a second ground conductor portion 15 formed by the conductive pattern 13 and provided so as to surround the second electrode 14.

The second electrode portion 14 and the second conductor portion 15 are provided at one side (upper side) of the circuit board 12. The second electrode portion 14 is connected to the conductive pattern 13 provided at the other side (lower side) of the circuit board 12 via a connecting conductor 16. Various electrical components 17 are provided on the lower surface of the circuit board 12 and the second conductor portion 15 is connected to the ground conductive pattern 13.

In the circuit board 12 having the above-described configuration, the second electrode portion 14 and the second conductor portion 15 are placed at the upper side so as to be accommodated in the cover 11 such that they face the inner surface of the cover 11.

The card 10 can be inserted into and ejected from the recessed portion 3a of the main body 2. When the card 10 is inserted into the recessed portion 3a, the second electrode portion 14 faces the first electrode portion 7 and the second conductor portion 15 faces the first conductor portion 8.

Subsequently, the operation of the information terminal provided with the card configured in this manner will be described. First, when the card 10 is inserted into the recessed portion 3a, the electrical circuit formed in the card 10 is connected to the electrical circuit of the information terminal 1.

At this time, the second electrode portion 14 and the second conductor portion 15 face the first electrode portion 7 and the first conductor portion 8, respectively, via a dielectric constituted by the cover 11, which comprises an insulating material, so as to be electrically connected to each other by capacitive coupling.

As a result, the antenna 6 is coupled to the electrical circuit in the card 10 by the capacitive coupling between the first and second electrode portions 7 and 14. The grounded first and second conductor portions 8 and 15 are coupled by capacitive coupling, and thus this capacitive coupling between the first and second conductor portions 8 and 15 surrounds the first and second electrode portions 7 and 14 coupled by capacitive coupling.

Accordingly, preferable HF matching can be realized and transmission loss can be reduced.

As shown in FIG. 5, the first and second electrode portions 7 and 14, which are placed in the center, sandwich the cover 11, which is a dielectric, so that coupling by a first capacitor C1 is achieved. Accordingly, the antenna 6 is electrically coupled to the card 10. Also, the first and second conductor portions 8 and 15 surrounding the first and second electrode portions 7 and 14 sandwich the cover 11, which is a dielectric, so that coupling by a second capacitor C2 is achieved.

The data from the information terminal 1 is transmitted to an external terminal (not shown) via the card 10 and the antenna 6 provided in the main body 2, so that exchange of data is performed between the information terminal 1 and the external terminal.

The card 10 may be a card other than the wireless card, such as a television card or a radio card. When the card 10 such as the television card or the radio card is inserted into the recessed portion 3*a*, the electrical circuit formed in the card 10 is connected to the electrical circuit in the information terminal so that a television signal or a radio signal can be received via the antenna 6 provided in the main body 2.

In the above-described embodiment, the first electrode portion 7 and the first ground conductor portion 8 are formed by the wiring pattern 5. Alternatively, the first electrode portion 7 and the first ground conductor portion 8 may be formed by a metal plate and the metal plate may be embedded in the case 3 or in a mounting member comprising an insulating material placed in the case 3.

In this case, the first conductor portion 8 is connected to the ground wiring pattern 5 in the wiring board 4.

Also, in the embodiment, the dielectric formed by the cover 11 comprising an insulating material is placed between the first and second electrode portions 7 and 14 and between the first and second conductor portions 8 and 15. However, the dielectric may be a dielectric formed by an insulating layer such as a resist provided on the first electrode portion 7 and the first conductor portion 8 or it may be air.

Further, in the embodiment, the first and second electrode portions 7 and 14 are coupled by capacitive coupling by the capacitor 1. However, a contact segment may be attached to one of the first and second electrode portions 7 and 14 and the contact segment may be brought into contact with the other one of the first and second electrode portions 7 and 14 so as to connect the antenna 6 and the conductor of the conductive pattern 13.

In addition, in the embodiment, the first and second conductor portions 8 and 15 are coupled by capacitive coupling by the capacitor 2. However, a contact segment may be attached to one of the first and second conductor portions 8 and 15 and the contact segment may be brought into contact with the other one of the first and second conductor portions 8 and 15 so as to connect the conductor portions.

What is claimed is:

1. The information terminal comprising:
   a card having a circuit board including a first electrical circuit; and
   a main body having a recessed portion for inserting therein and ejecting the card therefrom,
   wherein the main body comprises an antenna and the circuit board of the card comprises a conductor which is electrically coupled to the antenna and which is connected to the first electrical circuit,
   the first electrical circuit is electrically connected to the main body and the conductor is electrically coupled to the antenna when the card is inserted in the recessed portion, and
   a first electrode portion is provided for the antenna, a second electrode portion facing the first electrode portion is provided for the conductor so that the first and second electrode portions face each other and are coupled by capacitive coupling when the card is inserted into the recessed portion.

2. The information terminal according to claim 1, wherein a dielectric comprising an insulating material is placed between the first and second electrode portions.

3. The information terminal according to claim 2, wherein the card comprises an insulating cover for accommodating the circuit board and the cover is the dielectric placed between the first and second electrode portions.

4. The information terminal according to claim 1, wherein the main body comprises a first ground conductor portion that surrounds the first electrode portion and the circuit board comprises a second ground conductor portion that surrounds the second electrode portion so that the first and second conductor portions face each other when the card is inserted into the recessed portion.

5. The information terminal according to claim 4, wherein the main body further comprises a wiring board having a second electrical circuit, and wherein the first ground conductor portion is formed by a wiring pattern provided in the wiring board.

6. The information terminal according to claim 4, wherein the main body further comprises one of an insulating case and an insulating mounting member, and wherein the first conductor portion comprises a metallic material and is embedded in one of the case and the mounting member.

7. The information terminal according to claim 4, wherein a dielectric comprising an insulating material is placed between the first and second conductor portions so that the first and second conductor portions face each other and are coupled by capacitive coupling when the card is inserted into the recessed portion.

8. The information terminal according to claim 7, wherein the card comprises an insulating cover for accommodating the circuit board and the cover is the dielectric placed between the first and second conductor portions.

9. The information terminal comprising:
   a card having a circuit board including a first electrical circuit; and
   a main body having a recessed portion for inserting therein and ejecting the card therefrom,
   wherein the main body comprises an antenna and the circuit board of the card comprises a conductor which is electrically coupled to the antenna and which is connected to the first electrical circuit,
   the first electrical circuit is electrically connected to the main body and the conductor is electrically coupled to the antenna when the card is inserted in the recessed portion, and
   a first electrode portion is provided for the antenna, a second electrode portion facing the first electrode portion is provided for the conductor, a contact segment is connected to one of the first and second electrode portions, the contact segment contacts the other of the first and second electrode portions when the card is inserted into the recessed portion, thereby electrically coupling the antenna and the conductor.

* * * * *